(12) United States Patent
Heidenreich et al.

(10) Patent No.: US 8,715,092 B2
(45) Date of Patent: May 6, 2014

(54) COMPACT DISC SPRING TORQUE LIMITER

(75) Inventors: David C. Heidenreich, Akron, OH (US);
Richard E. Cole, Jr., Lagrange, OH (US)

(73) Assignee: EBO Group, Inc., Sharon Center, OH (US)

( * ) Notice: Subject to any disclaimer, the term of this patent is extended or adjusted under 35 U.S.C. 154(b) by 373 days.

(21) Appl. No.: 12/622,856

(22) Filed: Nov. 20, 2009

(65) Prior Publication Data
US 2011/0120830 A1    May 26, 2011

(51) Int. Cl.
*F16D 7/02*    (2006.01)
(52) U.S. Cl.
USPC .............................. 464/23; 464/46
(58) Field of Classification Search
USPC .......................... 464/23, 43, 45–48
See application file for complete search history.

(56) References Cited

U.S. PATENT DOCUMENTS

| | | | |
|---|---|---|---|
| 2,883,019 A * | 4/1959 | Kershner et al. | |
| 3,100,974 A * | 8/1963 | Wilson et al. | 464/46 |
| 5,688,176 A * | 11/1997 | Heidenreich et al. | 464/48 |
| 6,568,519 B2 * | 5/2003 | Lovatt | |

FOREIGN PATENT DOCUMENTS

GB    2 056 589 A  *  3/1981  ................. 464/46

* cited by examiner

*Primary Examiner* — Gregory Binda
(74) *Attorney, Agent, or Firm* — Renner, Kenner, Greive, Bobak, Taylor & Weber Co., L.P.A.

(57) ABSTRACT

A compact disc spring torque limiting clutch has an input hub and an output hub having a friction pack that is removable from the input hub as an entire unit to facilitate servicing and repair. The force actuator of the torque limiting clutch is a Belleville spring or machined disc spring that is operatively interposed between the input hub and the friction pack. The deflection of the Belleville spring during the useful life of the friction pack is within the flat portion of the force vs. deflection curve and establishes a characteristic breakaway torque for the torque limiting clutch. The use of a Belleville spring significantly reduces the axial dimension of the torque limiting clutch, adapting it for use in applications where space is at a premium.

12 Claims, 3 Drawing Sheets

COMPACT DISC SPRING TORQUE LIMITER

TECHNICAL FIELD

The invention herein resides in the art of power transmission devices and, more particularly, to torque limiting clutches of the friction type. More specifically, the invention presents a torque limiting clutch designed for use with hollow shaft motor applications, and which employs a machined disc spring, allowing for significant reduction in size without compromising operability.

BACKGROUND ART

The use of torque limiting clutches between input power sources and output mechanisms is well known. Typically, a torque limiting clutch has a characteristic breakaway torque allowing slippage between input and output shafts or mechanisms when the torque on the shafts exceeds the characteristic breakaway torque of the clutch.

Some machinery that employ torque limiting clutches use hollow shaft motors. For example, various pieces of underground mining equipment use hollow shaft electric motors to drive work implements. These motors commonly have a torque limiting clutch attached to one end, with the clutch input secured to the hollow motor shaft. The output of the torque limiting clutch is connected to an output shaft, or torque shaft that delivers torque to a work implement or a gear reduction box. Typically, the output shaft travels back through the motor inside the hollow motor shaft. The purpose for such an arrangement is to provide for easy accessibility to the clutch for servicing and to position the clutch on the opposite side of the motor than the work implement. When in use, the work implement may encounter a jam that acts to suddenly declerate the motor, creating a high level of torque. The purpose of the torque limiting clutch is to prevent this high level of torque from damaging the drive system components.

Access to a torque limiting clutch is necessary because the clutch must be disassembled to replace worn friction elements in the clutch and other maintenance activities. Access is also required because the clutch must be disassembled so that the input can be secured to the motor shaft. It is thus desirable to have a torque limiting clutch that is easy to disassemble and reassemble and is generally positioned in an accessible location.

A torque limiting clutch of a desirable nature, capable of achieving the benefits presented above, is presented and described in U.S. Pat. No. 5,688,176 for Multiple Disc Torque Limiter for Hollow Shaft Motors, owned by the assignee of the instant application. While this prior art device achieves some level of compactness, the implementation and utilization of spring cup assemblies are a limiting factor in size reduction and, it is desirable, to eliminate reliance on such spring cup assemblies in applications of the nature under consideration.

It is desirable that the overall structure and configuration of a compact torque limiter be such that the overall size, and particularly the axial length, be minimized It is further desirable that the friction area or region of a compact torque limiter of the nature under consideration be capable of being shielded or sealed from external contaminants present in the operational area. Yet further, for enhanced operability and adaptability, the utilization and implementation of speed sensors, wear indicators, and the like are deemed desirable, provided that they do not add to the overall size of the operational unit.

It is further most desirable that a torque limiting clutch of the type under consideration be given to ease of serviceability and refurbishment. To that end, it is desirable that the friction element of the clutch assembly be maintained as an integral unit and a portion of the output hub assembly which may be easily removed from the clutch assembly itself such that friction and separator elements may be removed, refurbished and replaced, along with any other parts requiring such servicing.

DISCLOSURE OF INVENTION

In light of the foregoing, it is a first aspect of the invention to provide a compact disc spring torque limiting clutch that does not rely on the use of spring cup assemblies for setting the characteristic breakaway torque.

Another aspect of the invention is the provision of a compact disc spring torque limiting clutch in which a machined disc spring, such as a Belleville spring, applies force on a end plate to set a characteristic breakaway torque for the clutch assembly.

Yet a further aspect of the invention is the provision of a compact disc spring torque limiting clutch particularly adapted for use in association with machines operating in conjunction with hollow shaft motors, which has an overall structure and configuration that minimizes the operational envelope required for the clutch.

Still a further aspect of the invention is the provision of a compact disc spring torque limiting clutch in which shields, sensors, wear indicators, and the like are provided in association with the clutch, without adding to the size or complexity thereof.

Yet an additional aspect of the invention is to provide a compact disc spring torque limiting clutch that provides the operational capabilities and characteristics of the prior art, in a more compact and space efficient envelope.

Still another aspect of the invention is the provision of a compact disc spring torque limiting clutch in which an output hub subassembly, including the friction portion of the clutch assembly, is readily removable from the unit for servicing and refurbishing.

The foregoing and other aspects of the invention which will become apparent as the detailed description proceeds are achieved by a compact torque limiting clutch, comprising: an input hub secured to a hollow shaft electric motor; an output hub secured to a shaft that passes through the hollow shaft electric motor; a friction pack interposed between said input and output hubs, said friction pack comprising a plurality of friction plates interposed between a plurality of separator plates, said friction and separator plates being sandwiched between an end plate and a disc spring, said disc spring urging said friction and separator plates into forceful engagement with each other.

Other aspects of the invention are attained by a friction pack for a compact torque limiting clutch, comprising: an end plate; a disc spring; a plurality of interleaved friction plates and separator plates sandwiched between said end plate and disc spring; and wherein said disc spring urges said friction and separator plates into forceful engagement with each other.

DESCRIPTION OF DRAWINGS

For a complete understanding of the various aspects, techniques and structures of the invention, reference should be made to the following detailed description and accompanying drawings wherein.

BEST MODE FOR CARRYING OUT THE INVENTION

Figure 1:
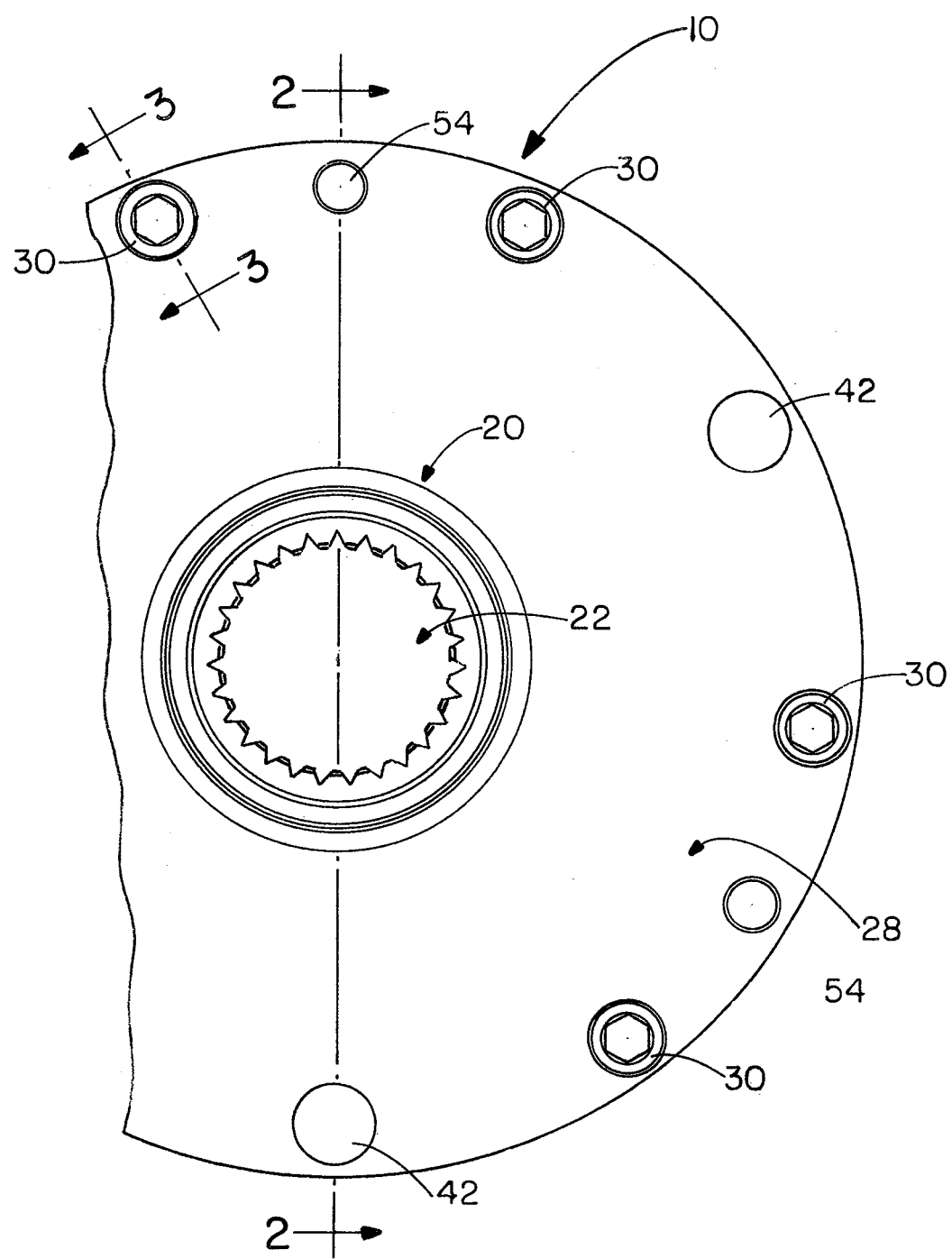
FIG. 1 is a partial end view of the torque limiting clutch according to the present invention.
Figure 2:
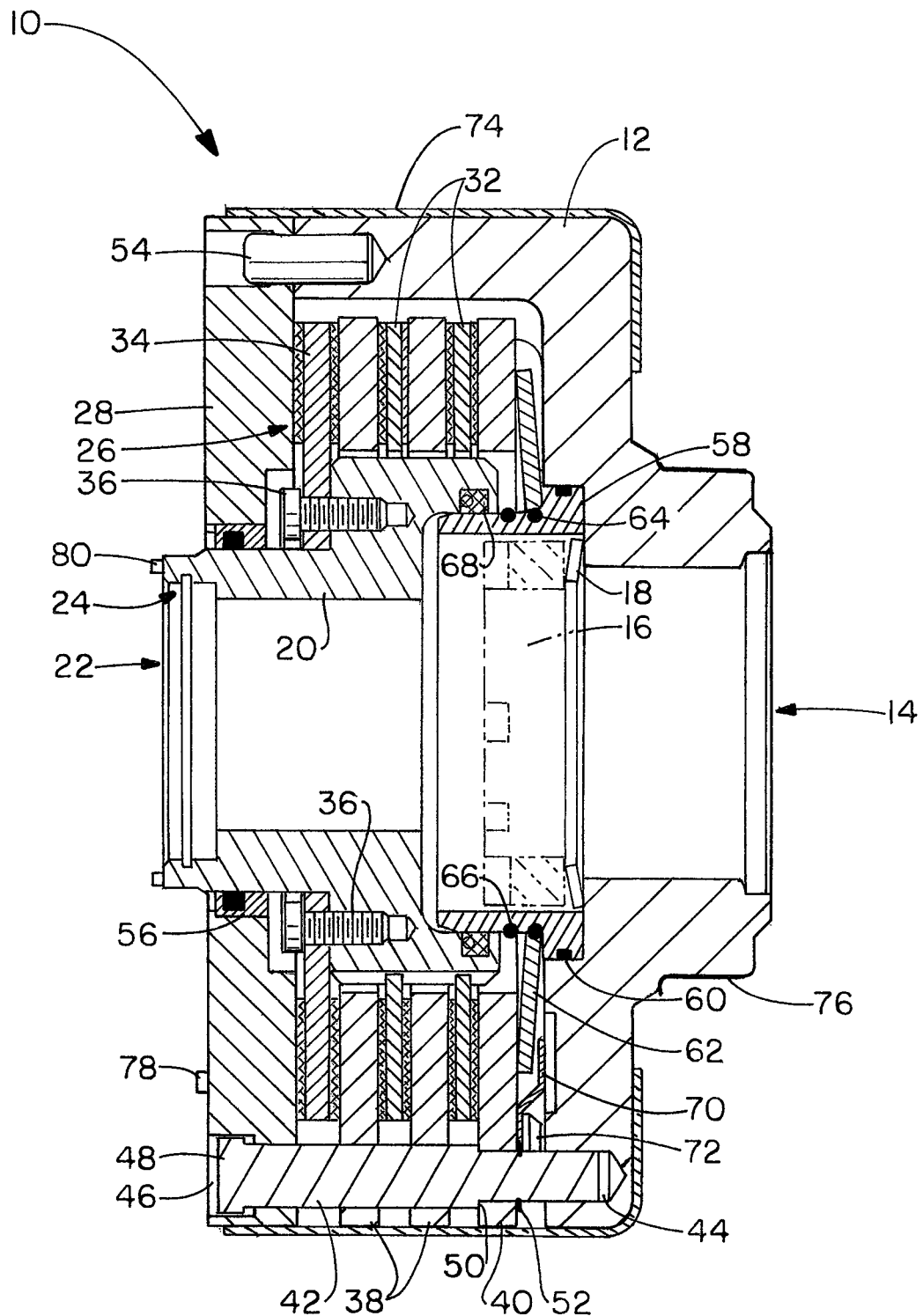
FIG. 2 is a cross sectional view of the torque limiting clutch of FIG. 1 taken along the line 2-2.

With reference now to FIGS. 1 and 2, it can be seen that a compact disc spring torque limiting clutch made in accordance with the invention is designated generally by the numeral 10. As major components, the torque limiting clutch 10 includes an input hub 12 having a splined central bore 14 passing therethrough. The bore 14 is adapted to receive a hollow externally splined input shaft (not shown) from a drive motor (not shown). The hollow externally splined input shaft is adapted to be secured to the input hub 12 by means of a nut 16 threaded thereto and against a lock washer 18, as shown.

Also included as part and parcel of the torque limiting clutch 10 is an output hub 20 having a central axially extending splined bore 22 passing therethrough. The splined bore 22 is adapted to receive a torque shaft (not shown), which typically passes through the hollow motor shaft to a gear box at the opposite end of the assembly. Accordingly, it will be appreciated that the bores 14, 22 are coaxial, with the bore 22 having a diameter sufficiently less than the diameter of the bore 14 to allow the torque shaft to be received by the splined bore and extend through the hollow motor shaft.

The end of the bore 22 is characterized by a torque shaft retainer portion 24, providing means for fixing the torque shaft to the output hub 20, such as by a keeper, retaining ring, or the like. Accordingly, the retainer portion 24 defines the maximum extension of the output end of the torque limiting clutch assembly 10, the same being adapted to be received by a cap of a receiving implement. This configuration allows for significant reduction in the axial dimension of the torque limiting clutch assembly 10.

Figure 3:
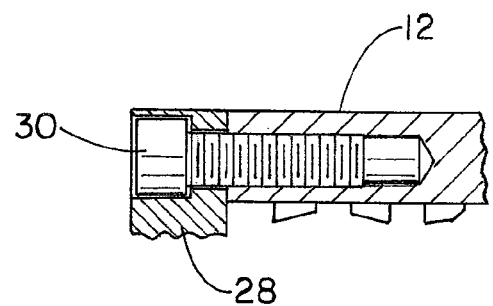
FIG. 3 is a partial cross sectional view of the torque limiting clutch assembly of FIG. 1, taken along the line 3-3.

Interposed between the input hub 12 and output hub 20 is a friction pack 26, including an end plate 28 fixed to the input hub 12 as by cap screws 30, as shown in FIGS. 1 and 3. A plurality of such cap screws are provided circumferentially about the end plate 28. The friction pack 26 further includes friction plates 32, 34 sandwiched between the input hub 12 and end plate 28. A pair of friction plates 32 are splined to and rotatable with the output hub 20. An additional friction plate 34 is fixed to the output hub 20 by means of cap screws 36. The spline and torque shaft retainer 24 of the output hub 20 partially protrudes beyond the end plate 28.

Sandwiched between the friction plates 32, 34 are separator plates 38, 40 having apertures passing therethrough for receiving torque pins 42. The torque pins 42 are received within bores 44 in the input hub 12 and counterbores 46 in the end plate 28. The counterbores 46 receive the heads 48 of the torque pins 42. The torque pins 42 have sections of two different diameters, defining a shoulder 50 which abuts the separator plate 40 received on the smaller diameter portion of the pin 42. The pin 42 is retained in this abutting position by means of a keeper or retaining ring 52. A plurality of dowel pins 54 are also provided for receipt in aligned bores in the end plate 28 and input hub 12 to maintain alignment and engagement therebetween.

A bronze bearing 56 is interposed between the output hub 20 and end plate 28 to allow for relative rotational movement between those members in the event the characteristic breakaway torque of the clutch assembly 10 is exceeded. At the opposite end of the clutch assembly 10, a seal ring 58 is received within a recessed annular groove about the inner periphery of the input hub 12. A seal 60 is interposed between the seal ring 58 and annular groove, as shown.

A machined disc spring 62, such as a Belleville spring, is interposed between the separator plate 40, which is fixed to the torque pin 42, and the seal ring 58. The mechanical disc spring or Belleville spring 62 is precision made so that the flat portion of the force vs. deflection curve characteristic of the spring lies in that range of desired operation of the clutch assembly 10 such that the breakaway torque characteristic of the clutch 10 will be substantially consistent throughout its range of operation from the friction pack being new to fully worn.

A first O-ring 64 is received within the seal ring 58 and receives the inner circumferential surface of the disc spring 62. Preferably, the O-ring 64 is of an elastomeric material that ensures centering of the disc spring 62 upon the seal ring 58. In other words, the resiliency of the O-ring 64 is such that uniform force distribution about the O-ring 64 achieves the desired centering. Also provided in a groove about the seal ring 58 is a second O-ring 66, serving as a keeper or retaining ring for the seal ring 58, ensuring that the seal ring is maintained upon the disc ring 62 during assembly and disassembly of the clutch assembly 10. Particularly, when the friction pack 26 and output hub 20 are removed from the input hub 12, the O-ring 66 ensures that the Belleville spring or machined disc spring 62 remains mounted upon the seal ring 58.

As further shown in FIG. 2, the output hub assembly 20 receives a seal 68, in engagement with the seal ring 58, to ensure that any oil, grease or lubricant that might pass from a connected piece of equipment along the torque tube and/or hollow motor tube does not enter into the region of the friction plates 32, 34 and separator plates 38, 40. In other words, the seal 68 is provided as a safety seal to protect the friction pack 26 in the event of failure of the operating equipment to which the torque limiting clutch 10 is connected.

With further reference to FIG. 2, it can be seen that the disc spring 62 is further retained by spring clips 70, secured by means of cap screws 72 to the separator plate 40, ensuring that the disc spring 62 is retained in association with the friction pack 26 during assembly and disassembly.

As shown in FIG. 2, the torque limiting clutch assembly 10 may be provided with a shield 74 circumferentially thereabout, the shield 74 protecting the friction pack assembly 26 from ambient debris and the like. Additionally, a sleeve 76 may be provided over the end portion of the input hub 12 to provide a finished surface. Those skilled in the art recognize that the sleeve 76 is primarily a finishing sleeve, reducing the amount of work necessary for otherwise finishing the exterior of the input hub 12.

The invention herein contemplates use with digital control and programmed operation. To that end, speed sensors 78 may be positioned upon the end plate 28, thereby being operatively secured to the input hub 12. In like manner, a speed sensor 80 may be attached to the output hub 20. The speed differential between the two would, of course, represent the slip between the input and output hubs, and may be used to adjust loading and the like.

Figure 4:
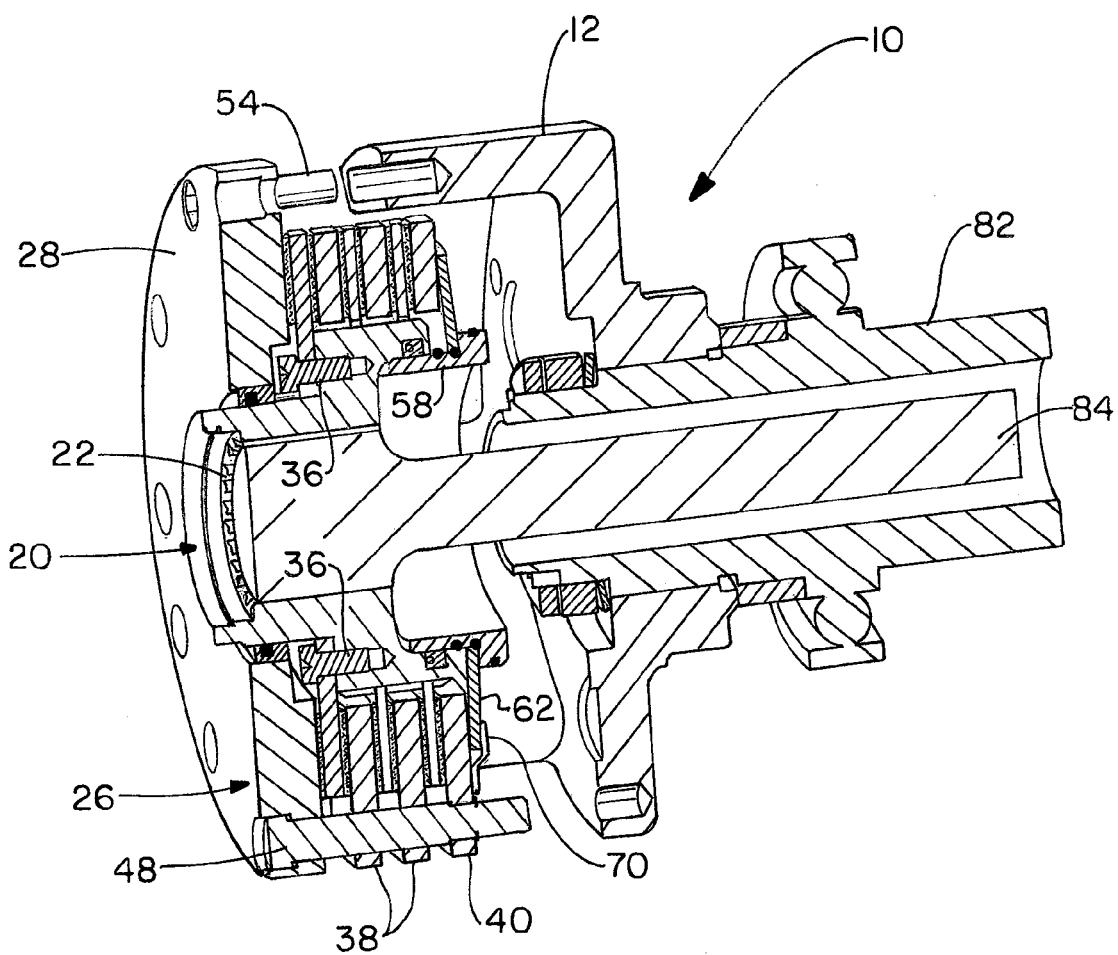
FIG. 4 is a partial sectional view of the assembly of FIGS. 1 and 2, showing the ease of separability of the output hub subassembly and friction pack from the clutch unit as a whole.

FIG. 4 shows a portion of the hollow shaft electric motor 82 secured to the input hub 12 and receiving the output shaft 84 received by the splined bore 22 of the output hub 20. In FIG. 4, it can be further seen that the friction pack 26 and output hub 20 may be removed as a unit from the input hub 12 to allow for ease of servicing, refurbishing and/or replacement of separator and friction discs as necessary. To that end, it will be appreciated that removal of bolts 30 disengage the end plate 28 from the input hub 12 and allow for axial removal of the output hub 20 and friction pack 26 as shown in FIG. 4. The keepers 52 about the torque pins 42 serve to secure the friction plates 32, 34 and separator plates 38, 40 to the end plate 28. The cap screws 72, securing the spring clips 70 to the separator plate 40 ensure retention of the disc spring or Belleville spring 62 during removal. Likewise, the keeper O-ring 66 and compressed elastomeric O-ring 64 ensure that the seal ring 58 is also maintained as part and parcel of the friction pack 26 during removal and replacement.

The determination of the time for service or repair may be made evident by the torque pins 42 which also serve as wear indicators, as will be apparent to those skilled in the art. As the friction and separator plates wear, the disc spring 62 urges the separator plate 40 toward the end plate 28, and the disc 62 urges against the seal ring 58. With the torque pins 42 secured to the separator plate 40 by keepers 52, as this wear occurs, the heads 48 of the pins 42 gradually move to the surface of the end plate 28. When the heads 48 are flush with the surface of the end plate 28, this signals that the separator and friction discs have worn to their maximum and that replacement and refurbishment is necessary. When the friction and separator discs are refurbished or replaced, and the friction pack 26 is repositioned and the assembly resecured by means of cap screws 36, compression and deflection of the disc spring 62 is such that the heads 48 of the torque pins 42 are recessed in the counterbore 46 and the wear and signaling process begins anew.

It will be appreciated that in operation of the compact disc spring torque limiting clutch 10, the machined disc spring 62 is configured such that it operates in a flat range of the force vs. deflection curve over the range of deflection accommodated by the torque and wear pin 42. The characteristic torque of the torque limiting clutch 10 is thus established by the machined disc spring 62, and the input hub 12 and output hub 20 operate in common rotation without slippage therebetween until the characteristic torque of the clutch 10, established by the disc spring 62, is exceeded. At that time, relative slippage between the input hub 12 and output hub 20 is experienced as slippage occurs between the friction plates 32, 34 and separator plates 38, 40, as well as the end plate 28. It is this slippage that generates the wear on the separator and friction plates.

Thus it can be seen that the various aspects of the invention have been attained by the structure presented and described above. By the elimination of elongated springs and/or spring cup assemblies, and the implementation of a Belleville type spring, operating in the flat range of the force vs. deflection curve, the size of the compact disc spring torque limiting clutch 10 is significantly reduced over those of the prior art. Moreover, by providing a friction pack assembly that is readily removable as a unit from the input hub, servicing, repair and replacement of worn parts is greatly facilitated and expedited, such that down time or out-of-service time is kept at a minimum.

While in accordance with the patent statutes only the best mode and preferred embodiment of the invention has been presented and described in detail, the invention is not limited thereto or thereby. Accordingly, for an appreciation of the true scope and breadth of the invention reference should be made to the following claims.

What is claimed is:

1. A compact torque limiting clutch for a hollow shaft electric motor, comprising:
    an input hub secured to a hollow shaft electric motor;
    an output hub secured to a shaft that passes through said hollow shaft electric motor;
    a friction pack interposed between said input and output hubs, said friction pack comprising a plurality of friction plates interposed between a plurality of separator plates, said friction and separator plates being sandwiched between an end plate and a disc spring, said disc spring received by a seal ring that engages said input hub and wherein a seal is interposed between said seal ring and said output hub, said disc spring urging said friction and separator plates into forceful engagement with each other; and
    wherein said disc spring urges said forceful engagement between said input hub and said end plate and wherein said disc spring has a characteristic relationship between force and deflection and wherein said relationship is substantially constant throughout a useful operating life of said friction pack.

2. The compact torque limiting clutch according to claim 1, wherein said friction pack further comprises spring clips retaining said disc spring as a portion of said friction pack.

3. The compact torque limiting clutch according to claim 2, further comprising a first O-ring interposed between said disc spring and said seal ring, said first O-ring centering said disc spring upon said seal ring.

4. The compact torque limiting clutch according to claim 2, wherein said end plate is removably securable to said input hub.

5. The compact torque limiting clutch according to claim 4, wherein said end plate and sandwiched separator and friction plates are secured together by torque pins.

6. The compact torque limiting clutch according to claim 5, wherein at least one of said torque pins is also a wear pin, indicating a state of wear and remaining useful life of said friction and separator plates.

7. The compact torque limiting clutch according to claim 1, wherein said disc spring, seal ring, and end plate are coaxial with and located radially outwardly from an axial bore of said input hub.

8. The compact torque limiting clutch according to claim 1, wherein said output hub comprises a spline and torque shaft retainer partially protruding beyond said end plate.

9. The compact torque limiting clutch according to claim 8, further comprising first and second speed sensors respectively operatively connected to said input and output hubs.

10. The compact torque limiting clutch according to claim 1, further comprising a shield extending circumferentially about and axially along said friction pack and at least a portion of said input hub.

11. A friction pack for a compact torque limiting clutch, comprising:
    an end plate;
    a disc spring;
    a plurality of interleaved friction plates and separator plates sandwiched between said end plate and disc spring; and
    a first O-ring interposed between said disc spring and a seal ring, said seal ring being adapted for receipt by an input hub, said first O-ring centering said disc upon said seal ring; and
    wherein said disc spring urges said friction and separator discs into forceful engagement with each other.

12. The friction pack for a compact torque limiting clutch according to claim 11, wherein said friction pack further comprises spring clips retaining said disc spring as a portion of said friction pack.

* * * * *